United States Patent [19]

Borisenko et al.

[11] 4,181,049
[45] Jan. 1, 1980

[54] METHOD OF MACHINING SOLIDS OF REVOLUTION BY ROTARY CUTTING TOOLS AND A TOOLHOLDER FOR CARRYING SAME INTO EFFECT

[76] Inventors: Alexandr V. Borisenko, Leninsky prospekt, 127, kv. 178; Evgeny A. Serebryakov, ulitsa Chervyakova, 95/26, kv. 1; Anatoly F. Sakun, ulitsa Kalinovskogo, 57, kv. 4, all of Minsk; Valentin T. Bazin, ulitsa Bulatnikovskaya, 11, kv. 58, korpus 1, Moscow, all of U.S.S.R.

[21] Appl. No.: 892,036

[22] Filed: Mar. 31, 1978

[30] Foreign Application Priority Data

Apr. 4, 1977 [SU] U.S.S.R. .............................. 2470335
May 12, 1977 [SU] U.S.S.R. .............................. 2484455

[51] Int. Cl.$^2$ .......................... B23B 3/00; B26D 1/12; B23B 29/00
[52] U.S. Cl. ........................................ 82/1 C; 407/7; 82/37
[58] Field of Search .......................... 82/1 C, 36 R, 37; 407/7

[56] References Cited

U.S. PATENT DOCUMENTS

| 2,127,523 | 8/1938 | Kraus | 82/1 C |
| 3,155,008 | 11/1964 | Sporck | 82/1 C |
| 3,741,070 | 6/1973 | Berthiez | 82/1 C |

*Primary Examiner*—Harrison L. Hinson
*Attorney, Agent, or Firm*—Robert E. Burns; Emmanual J. Lobato; Bruce L. Adams

[57] ABSTRACT

A method of machining solids of revolution by a rotary cutting tool whose effective portion is shaped as a solid of revolution set on a spindle and having a circular cutting lip, said solid of revolution being imparted rotation during the cutting process, wherein the tool axis is positioned in the plane parallel to the basic plane passing through the axis of machine centers and makes up an angle with the projection of the axis of machine centers on said plane. The distance from the plane of the tool axis to said basic plane and said angle of setting the tool axis are estimated using the following relation:

$$H = (D/2) \sin\omega + (d\, tg\omega/2\sqrt{\sin^2\phi + tg^2\omega})$$

where
H is the distance from the plane of the tool axis to the basic plane passing through the axis of machine centers;
D is the diameter of the workpiece being machined;
d is the diameter of the circular cutting lip;
$\omega$ is the central angle of setting the tool point with respect to the basic plane;
$\phi$ is the angle of setting the tool axis with respect to the projection of the axis of centers on the plane of the tool axis.

The toolholder for carrying said method into effect comprises a body having an inclined top bearing surface and provided with longitudinal ways, a tool clamp mounted traversably along the body ways and fixably in a required position on the inclined body surface, and having a hole for the tool to accommodate. The hole in the tool clamp makes up an angle with the body ways and is parallel to the body base, whereas the angle of elevation of the inclined top bearing surface of the body is equal to a preset central angle of setting the tool point with respect to the basic plane passing through the axis of machine centers.

The present invention is instrumental in increasing vibration resistance of the cutting process and adding to the quality of workpieces machined.

2 Claims, 5 Drawing Figures

METHOD OF MACHINING SOLIDS OF REVOLUTION BY ROTARY CUTTING TOOLS AND A TOOLHOLDER FOR CARRYING SAME INTO EFFECT

The present invention relates generally to the art of metal cutting and has particular reference to methods of machining solids of revolution by rotary tools and to constructions of toolholders for said tools.

The herein-proposed invention is most expedient to be applied for machining exposed surfaces of solids of revolution.

Known in the art is a method of machining solids of revolution by a rotary tool whose effective portion is shaped as a solid of revolution having a circular cutting lip and held on a spindle. According to said known the tool axis is set in the plane parallel to the basic plane passing through the axis of machine centres and at an angle to the projection of the axis of machine centres on said plane of the machine.

In order to carry said known method intp effect use may be made of a toolholder comprising a body having an inclined top bearing surface and longitudinal ways adapted for a spring-loaded platform to slide along through the agency of a slide block and a number of articulated linkages, said platform carrying a clamp provided with a hole for the tool to accommodate and hold. The tool clamp is fixable in a required position with respect to the workpiece being machined, which makes it possible to change the distance from the tool point to the axis of machine centres.

However, in said method there is unknown the relationship between the distance H from the plane of the tool axis to the basic plane passing through the axis of machine centres, and the angle $\phi$ made up by the tool axis and the projection of the axis of machine centres on the plane of the tool axis, at a definite magnitude of the angle $\omega$ which is in fact the central angle of setting the tool point with respect to the basic plane. That is why the machine is practically incapable, without resorting to special attachments, of setting the point (i.e., forming point) of the circular cutting lip exactly to the angle $\omega$ with respect to the basic plane, because one must find a common tangent line to the two second-order curves (viz., the circle which is in fact the cross section of the workpiece, and the ellipse which is in effect the projection of the circular cutting lip on the plane perpendicular to the axis of machine centres). Any inaccuracy in setting the point of the tool circular cutting lip affects adversely kinematic tool angles and causes lowfrequency vibrations; this, in turn, impairs the quality of surface finish of the workpieces being machined. Moreover, the distance H from the plane of the tool axis to the basic plane depends on the workpiece diameter. Disposing the point of the circular cutting lip below the axis of machine centres causes redistribution of the radial and tangential components of the cutting force within the machine coordinates which likewise influences vibration resistance of the cutting process and, eventually, the quality of surface finish and dimensional accuracy of the workpieces being machined.

The known prior-art construction of the toolholder is a sophisticated one and possesses but low vibration resistance in the case of rotary cutting with high cutting speeds, as the spring-loaded platform is traversable through the agency of the slide block, and the construction incorporates articulated linkages. Moreover, in order to provide optimum cutting angles when cutting different-diameter workpieces by virtue of rotary cutting tools, the forming point of the circular cutting lip of the tool must be set at definite angles $\omega$ and $\phi$ with respect to the workpiece, which fails to be obtained by the now-existing construction of the toolholder.

It is an essential object of the present invention to improve the quality of machining workpieces and increase the dimensional accuracy thereof.

The essence of the present invention resides in that in a method of machining solids of revolution by a rotary tool whose effective portion is shaped as a solid of revolution having a circular cutting lip and set on a spindle, said solid of revolution being imparted rotation during the cutting process, wherein the tool axis is set in the plane parallel to the basic plane passing through the axis of machine centres and at an angle to the projection of the axis of centres on said plane, according to the invention the distance from the plane of the tool axis to said basic plane and said angle of setting of the tool axis are selected from the following relation:

$$H = (D/2)\sin\omega + (d\, tg\omega/2\sqrt{\sin^2\phi + tg^2\omega})$$

where

H is the distance from the plane of the tool axis to the basic plane passing through the axis of machine centres;

D is the diameter of the workpiece being machined;

d is the diameter of the circular cutting lip;

$\omega$ is the central angle of setting the tool point with respect to the basic plane;

$\phi$ is the angle of setting the tool axis with respect to the projection of the axis of centres on the plane of the tool axis.

The herein-proposed invention enables one to select from the aforesaid relation between the parameters of tool setting, the plane of the tool axis with respect to the basic plane, i.e., to set accurately the point of the circular cutting lip at the angles $\omega$ and $\phi$ with respect to the workpiece being machined, as well as to provide for optimum kinematic angles of the tool, which adds to vibration resistance of the cutting process and to the quality of machining.

It is expedient that the distance from the plane of the tool axis to the basic plane passing through the axis of machine centres be not less than 0.1 of the diameter of the workpiece being machined.

Disposing the tool axis at a distance equal to 0.1 of the workpiece diameter from the basic plane passing through the axis of machine centres makes it possible to balance the moments developed by the radial component of the cutting force which tends to press the tool off the workpiece, and by the tangential component of the cutting force which tends to press the saddle against the bedways of the machine. The longer the distance from the plane of the tool axis to the basic plane passing through the axis of machine centres the higher the moment developed by the tangential component, which enhances vibration resistance of the machining process, the quality of surface finish and machining accuracy of the workpieces.

The essence of the present invention resides also in that in a toolholder for carrying into effect a method of machining solids of revolution, comprising a body having an inclined top bearing surface provided with longitudinal ways, a tool clamp mounted traversably along the body ways and fixably in a required position on the body inclined surface and having a hole for the tool to accommodate, according to the invention the hole in the tool clamp makes up an angle with the body ways and is parallel to the body base, whereas the angle of elevation of the inclined top bearing surface of the body is equal to a preset central angle to setting the tool point with respect to the basic plane.

Provision of the hole in the tool clamp in an angular position with respect to the body ways and parallel to the body base enables the rotary tool axis to be disposed in the plane parallel to the basic plane passing through the axis of machine centres and at an angle $\phi$ to the projection of the axis of machine centres on said plane. In addition, making an angle $\beta$ of elevation of the inclined top surface of the body equal to the central angle $\omega$ of setting the tool point with respect to the basic plane allows the tool to be set for height so as to suit the workpiece of any radius by merely displacing the tool clamp over a distance equal to the workpiece radius.

It is desirable that a scale be provided along the body ways, graduated in terms of the radii of the workpieces being machined.

This cuts down auxiliary time spent for resetting the machine when passing to machining a workpiece of another diameter.

In what follows the present invention is illustrated in a description of some embodiments thereof with reference to the accompanying drawings, wherein.

The method of machining solids of revolution by a rotary tool proposed in the present invention, is carried into effect as follows.

Figure 1:
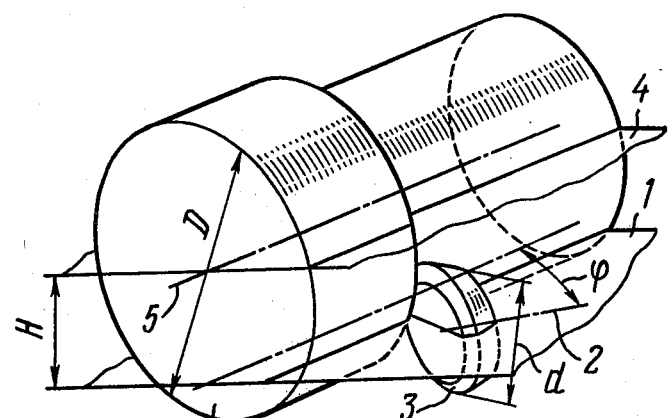
FIGS. 1 and 2 illustrate schematically the diagrams of carrying into effect a method of machining solids of revolution by a rotary tool, according to the invention.

One must estimate the distance H (FIG. 1) from a plane 1 of axis 2 of rotation of a rotary tool 3 to a basic plane 4 passing through an axis 5 of machine centres, using the relationship expressed by the formula:

$$H=(D/2)\sin\omega + (d\ tg\omega/2\sqrt{\sin^2\phi + tg^2\omega})$$

where

Figure 2:
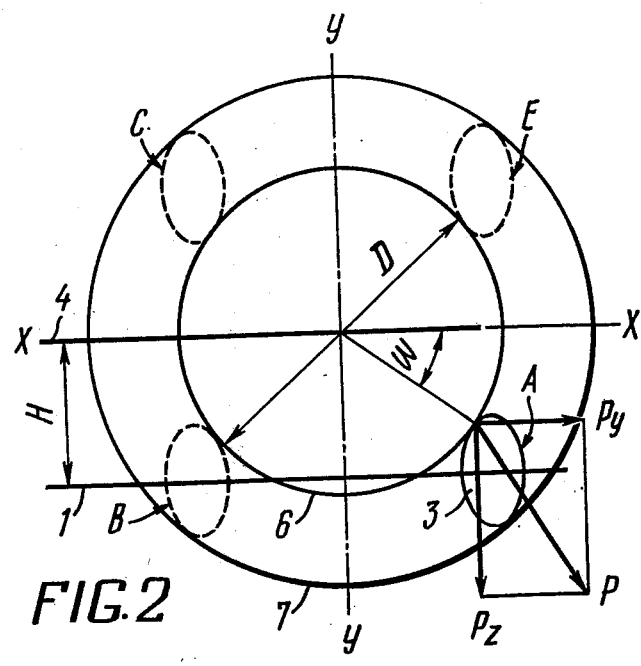

H is the distance from the plane of the axis 2 of the tool 3 to the basic plane 4 passing through the axis 5 of machine centres;

D is the diameter of a workpiece 6 being machined;

d is the diameter of the circular cutting lip of the tool 3;

$\omega$ (FIG. 2) is the central angle of setting the point of the tool 3 with respect to the basic plane 4;

$\phi$ (FIG. 1) is the angle of position of the axis 2 of the tool 3 with respect to the projection of the axis 5 of machine centres on the plane 1 of the axis 2 of the tool 3.

The angle $\omega$ (FIG. 2) is so selected that the distance H between said planes 1 and 4 should be in excess of 0.1 D (the diameter of the workpiece 6). As it is evident from FIG. 2 the longer the distance H the lower the radial component $P_y$ of the cutting force which tends to press the tool 3 off the workpiece 6 and the higher the tangential component $P_z$ of the cutting force which tends to press the saddle against machine bedways (not shown). Such a redistribution of the cutting force components adds to vibration resistance of the cutting process, to the quality of surface finish and dimensional accuracy of the workpieces being machined.

Apart from the position A the tool 3 can also be set to the positions B, C and E symmetrical to the coordinate axes x—x and y—y. The possible positions for rotary tools to set are indicated on a circle 7 conventionally representing the inside surface of a workpiece so as to turn out the latter.

Thus, for instance, when turning the workpiece 6 having the diameter D=100 mm by the rotary tool 3 having the diameter d of the circular cutting lip thereof equal to 40 mm, the magnitude of the angles $\omega$ and $\phi$ are selected to be 25° and 40°, respectively, so as to attain a preset surface finish within the 6th grade, whereupon the distance H is calculated to be 32.9 mm proceeding from the formula set forth hereinbefore.

Figure 3:
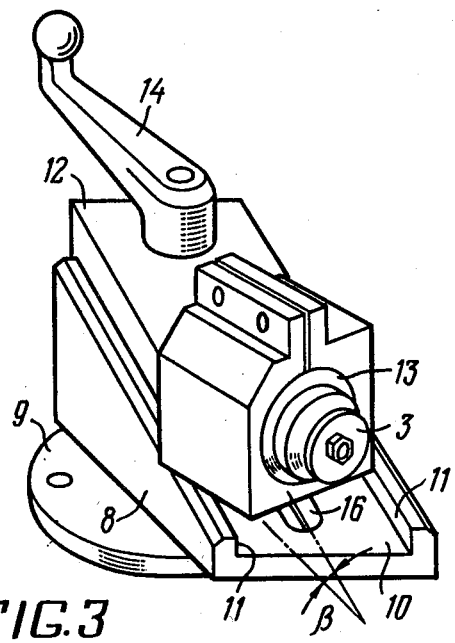
FIG. 3 is a perspective view of a toolholder, according to the invention.
Figure 4:
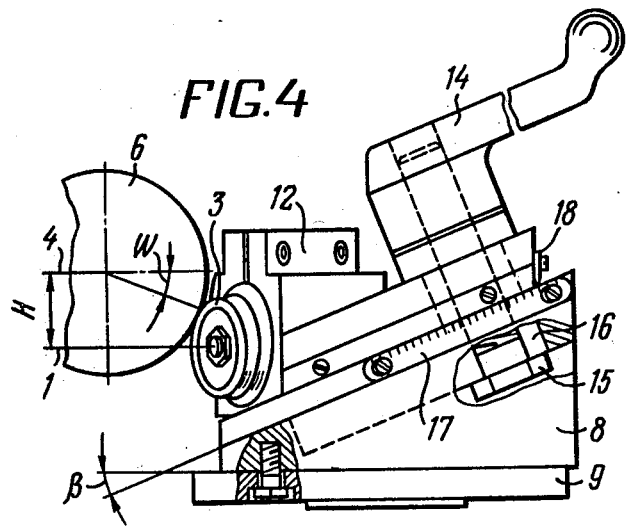
FIG. 4 is a side, fragmentarily cutaway view of FIG. 3.
Figure 5:
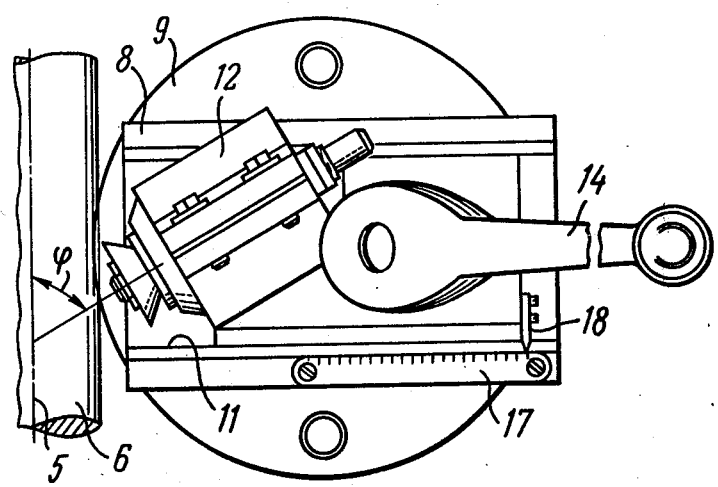
FIG. 5 is a plan view of FIG. 3.

The herein-proposed method may be carried into effect with the use of a toolholder, comprising a body 8 (FIG. 3) made fast on a flange 9 mounted on machine saddle (not shown) instead of a standard toolholder. The body 8 has an inclined top bearing surface 10 which makes up an angle $\beta$ (FIGS. 3, 4) with the base of the body, said angle being equal to a preset angle. A tool clamp 12 is mounted between ways 11 (FIG. 3) of the body 8 traversably therealong, said clamp having a hole arranged at an angle of 90°$-\phi$ (FIG. 5) to the ways 11 of the body 8 and parallel to the base thereof, said hole being adapted for the tool 3 to accommodate; the tool 3 is fitted in an expansion eccentric sleeve 13 (FIG. 3) adapted to adjust the position of the point of the tool 3 after its regrindings. The tool clamp 12 is locked in a required position by a lever 14 and a bolt 15 (FIG. 4) which is traversable along a slot 16 made in the body 8 between the ways 11 (FIG. 3). The outside face of one of the ways 11 bears a scale 17 (FIGS. 4, 5) graduated in terms of various radii of the workpieces 6 being machined. Equality of the angles $\beta$ and $\omega$ (FIG. 4) enables one to calculate once the height H for a definite workpiece, set an index 18 secured on the tool clamp 12, to a graduation mark corresponding to the radius of said workpiece and then machine the workpieces of any size, having made the index 18 coincide with the respective graduation mark of the scale 17 corresponding to the radius of the workpiece 6 being machined. Thus, by merely shifting the tool clamp 12 along the inclined surface 10 (FIG. 3) to the graduation mark of the scale 17 (FIG. 4) corresponding to the radius of the workpiece 6, and fixing the tool clamp 12 in said position by the lever 14, one can set the axis of the tool 3 at the distance H from the basic plane 1, thereby setting the forming point of the tool 3 to the working position.

What is claimed is:

1. A method of machining solids of revolution by a rotary tool whose effective portion is shaped as a solid of revolution held on a spindle and having a circular cutting lip, said solid of revolution being imparted rotation during the cutting process, resides in that the tool axis is set in the plane parallel to the basic plane passing through the axis of machine centres, and at an angle to the projection of the axis of centres on said plane, whereas the distance from said plane of the tool axis to said basic plane and said angle of the tool axis position are selected from the following relation:

$$H=(D/2)\sin\omega + (d\ tg\omega/2\sqrt{\sin^2\phi + tg^2\omega})$$

where

H is the distance from the plane of the tool axis to the basic plane passing through the axis of machine centres;

D is the diameter of the workpiece being machined;

d is the diameter of the circular cutting lip;

ω is the central angle of setting the tool point with respect to the basic plane;

φ is the angle of setting the tool axis with respect to the projection of the axis of machine centres on the plane of the tool axis.

2. A method as claimed in claim 1, wherein said distance from the plane of the tool axis to the basic plane passing through the axis of machine centres, is selected to be at least 0.1 of the diameter of the workpiece being machined.

* * * * *